(12) United States Patent
Bucci et al.

(10) Patent No.: US 10,404,448 B2
(45) Date of Patent: Sep. 3, 2019

(54) COMMUNICATION DEVICES, METHOD FOR DETECTING AN EDGE IN A RECEIVED SIGNAL AND METHOD FOR RECEIVING DATA

(71) Applicant: Infineon Technologies AG, Neubiberg (DE)

(72) Inventors: Marco Bucci, Graz (AT); Raimondo Luzzi, Graz (AT)

(73) Assignee: Infineon Technologies AG, Neubiberg (DE)

(*) Notice: Subject to any disclaimer, the term of this patent is extended or adjusted under 35 U.S.C. 154(b) by 10 days.

(21) Appl. No.: 15/602,199

(22) Filed: May 23, 2017

(65) Prior Publication Data

US 2017/0346620 A1    Nov. 30, 2017

(30) Foreign Application Priority Data

May 27, 2016    (DE) .................. 10 2016 109 799

(51) Int. Cl.
| | |
|---|---|
| *H04L 7/00* | (2006.01) |
| *H04L 7/04* | (2006.01) |
| *H04L 25/03* | (2006.01) |
| *H04L 27/08* | (2006.01) |
| *H04L 7/033* | (2006.01) |

(52) U.S. Cl.
CPC ............ *H04L 7/048* (2013.01); *H04L 7/0087* (2013.01); *H04L 7/0331* (2013.01); *H04L 7/044* (2013.01); *H04L 25/03006* (2013.01); *H04L 27/08* (2013.01); *H04L 2025/0377* (2013.01)

(58) Field of Classification Search
CPC ........................................................ H04L 7/00
USPC ........................................................ 375/354
See application file for complete search history.

(56) References Cited

U.S. PATENT DOCUMENTS

| | | | |
|---|---|---|---|
| 2008/0279316 A1* | 11/2008 | Chen ................. | H04L 25/03885 375/345 |
| 2010/0097078 A1* | 4/2010 | Philipp ................. | G06F 3/0418 324/684 |
| 2012/0183100 A1 | 7/2012 | Luzzi et al. | |

FOREIGN PATENT DOCUMENTS

| | | |
|---|---|---|
| EP | 2663046 A1 | 11/2013 |
| WO | 0118808 A1 | 3/2001 |

* cited by examiner

*Primary Examiner* — Kevin M Burd
(74) *Attorney, Agent, or Firm* — Viering, Jentschura & Partner MBB

(57) ABSTRACT

A communication device includes a sampler configured to sample an input signal, wherein the sampler is configured to generate a sampled value for each sampling time of a sequence of sampling times, a sequence value generator configured to generate an output value for each sampling time of the sequence of sampling times based on the sampled values, wherein the sequence value generator is configured to set the output value for a sampling time based on the sampled value for the sampling time and based on a limitation of the difference between the output value for the sampling time and the output value for the preceding sampling time in the sequence of sampling times, and an edge detector configured to detect an edge in the input signal based on the output values.

19 Claims, 15 Drawing Sheets

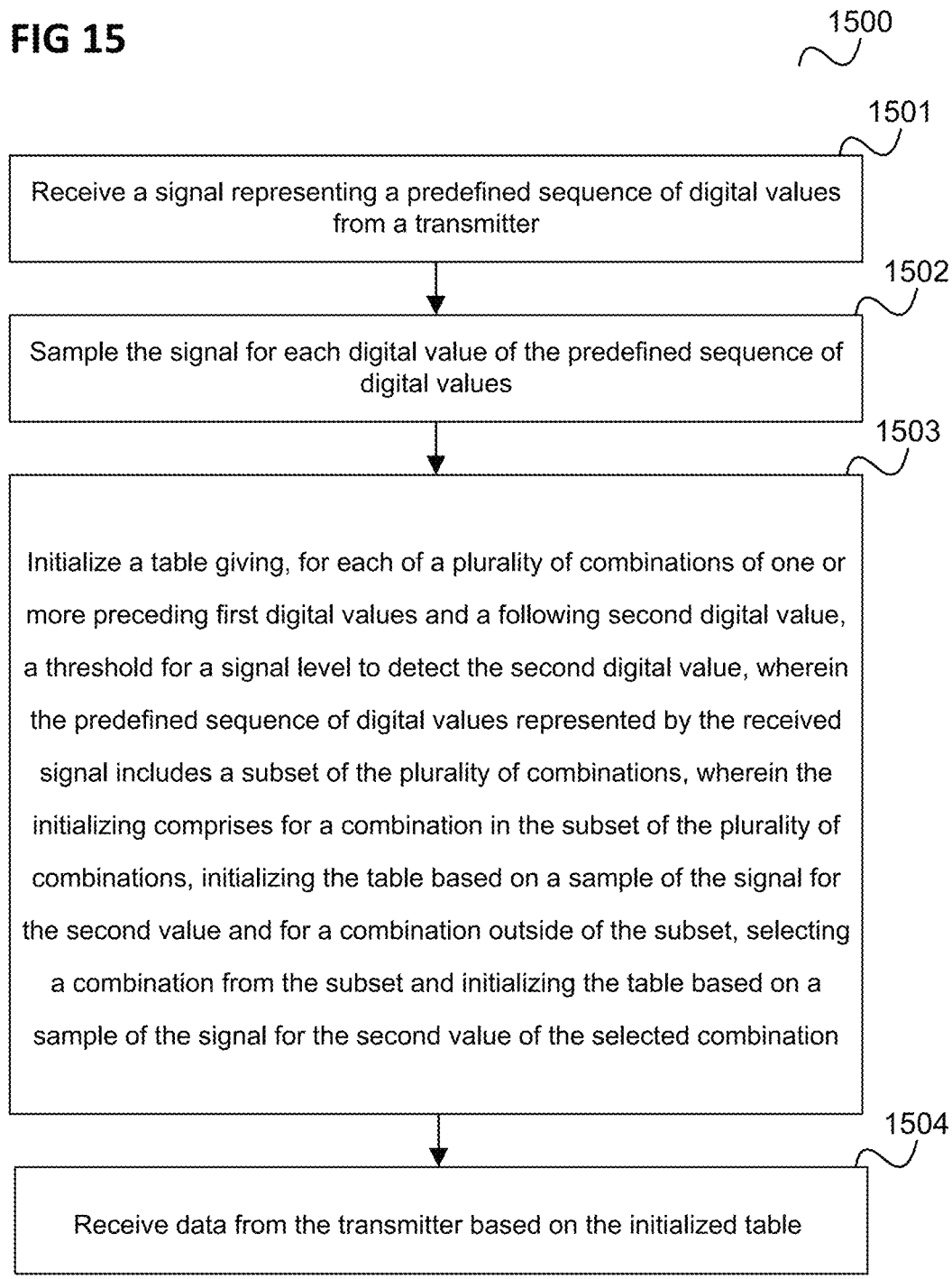

COMMUNICATION DEVICES, METHOD FOR DETECTING AN EDGE IN A RECEIVED SIGNAL AND METHOD FOR RECEIVING DATA

CROSS-REFERENCE TO RELATED APPLICATION

This application claims priority to German Patent Application Serial No. 10 2016 109 799.3, which was filed May 27, 2016, and is incorporated herein by reference in its entirety.

TECHNICAL FIELD

The present disclosure relates to communication devices, methods for detecting an edge in a received signal and methods for receiving data.

BACKGROUND

Wireless communication such as radio communication between a chip card reader and a chip card may be based on a protocol such as ISO 14443 which has asynchronous timing and lacks synchronization and training patterns. For using a synchronous digital receiver in such a scenario, approaches which nevertheless allow efficient synchronization and training are therefore desirable.

SUMMARY

A communication device is provided including a sampler configured to sample an input signal, wherein the sampler is configured to generate a sampled value for each sampling time of a sequence of sampling times, a sequence value generator configured to generate an output value for each sampling time of the sequence of sampling times based on the sampled values, wherein the sequence value generator is configured to set the output value for a sampling time based on the sampled value for the sampling time and based on a limitation of the difference between the output value for the sampling time and the output value for the preceding sampling time in the sequence of sampling times and an edge detector configured to detect an edge in the input signal based on the output values.

Further, a method for detecting an edge in a received signal according to the communication device described above is provided.

Further, a communication device is provided including a receiver configured to receive a signal representing a predefined sequence of digital values from a transmitter, a sampler configured to sample the signal for each digital value of the predefined sequence of digital values, a memory configured to store a table giving, for each of a plurality of combinations of one or more preceding first digital values and a following second digital value, a threshold for a signal level to detect the second digital value, wherein the predefined sequence of digital values represented by the received signal includes a subset of the plurality of combinations, an initializer configured to for a combination in the subset of the plurality of combinations, initialize the table based on a sample of the signal for the second value and for a combination outside of the subset, select a combination from the subset and initialize the table based on a sample of the signal for the second value of the selected combination and a data recovery circuit configured to receive data from the transmitter based on the initialized table.

Further, a method for receiving a signal according to the communication device described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 15 shows a flow diagram illustrating a method for receiving data.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
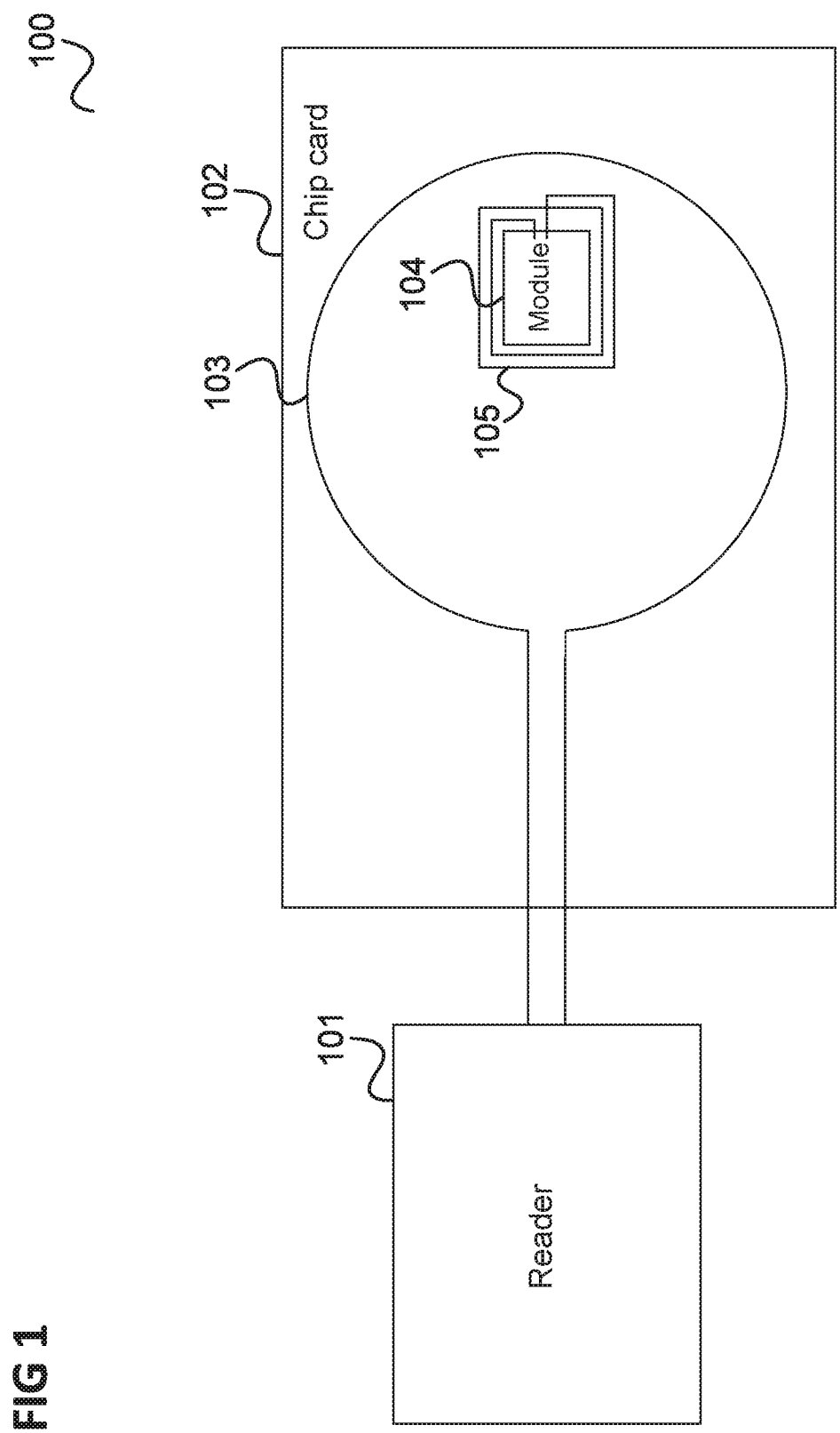
FIG. 1 shows a communication arrangement including a reader and a chip card.

FIG. 1 shows a communication arrangement 100 including a reader 101 and a chip card 102. The reader includes an antenna 103 which is for example arranged in a housing onto which the chip card 102 is placed. The chip card 102 includes a chip card module 104 and a chip card antenna 105.

The reader 101 and the chip card module 104 may communicate by means of the antennas 103, 105.

A contactless chipcard (or generally a contactless transponder) according to ISO 14443 communicates with a reader using amplitude shift keying (ASK) modulation. Two different modulation indexes are defined: 10% (nominal) for the so called Type-B communication and 100% for Type-A communication.

In the following embodiments a receiver circuit (e.g. used in chip card module 104) for a ISO 14443 Type-B transponder is described, addressing the basic frame type where the asynchronous timing (SOF(start of frame)-high, SOF-low, EGT (extra guard time) between two bytes, EOF(end of frame)) and the lack of synchronization and training patterns do not allow to employ algorithms for an ASK synchronous receiver.

Figure 2:
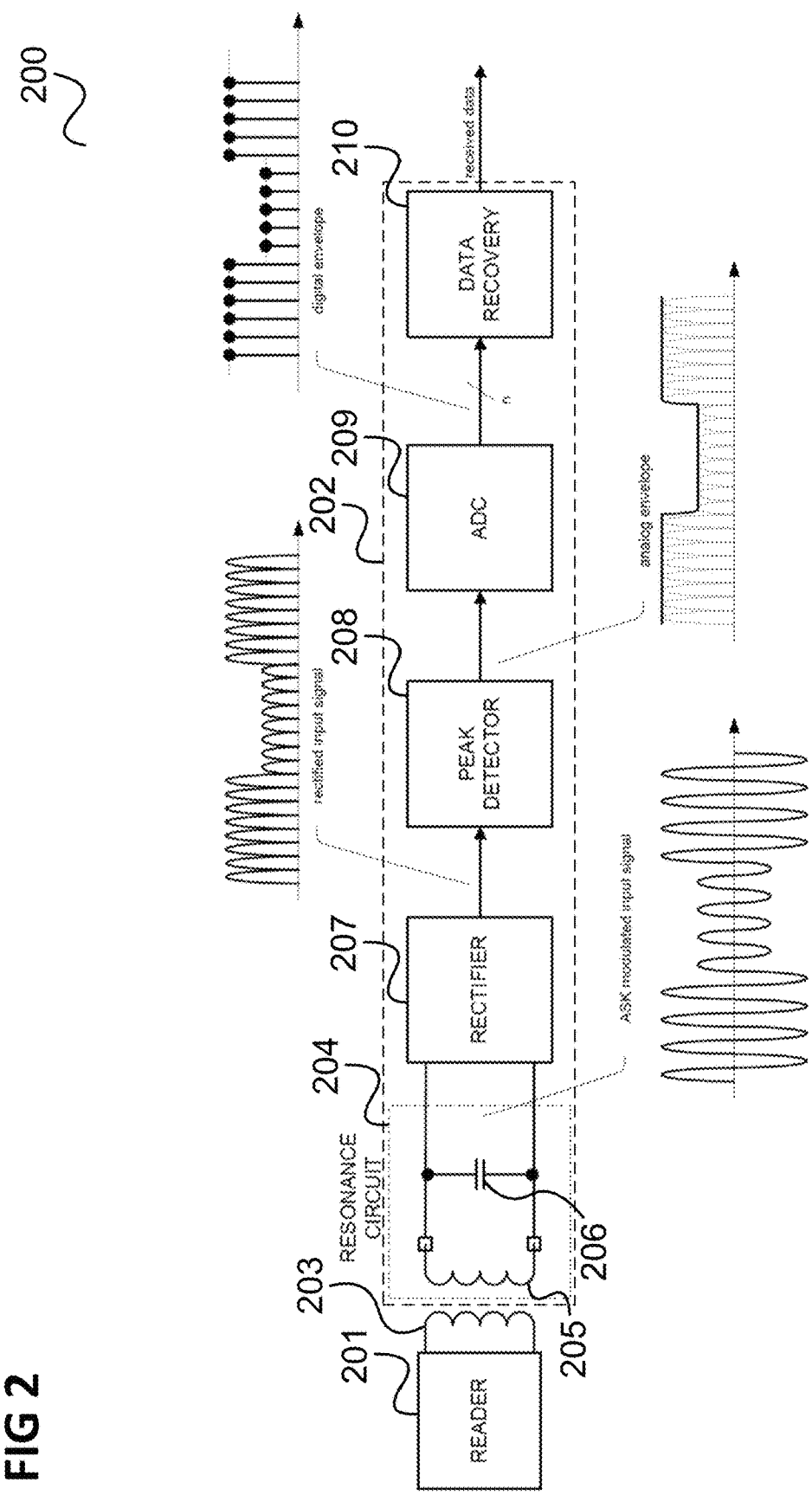
FIG. 2 shows a communication arrangement including a reader and an ASK (amplitude shift keying) digital receiver.

FIG. 2 shows a communication arrangement 200 including a reader 201 (e.g. corresponding to the reader 101) and an ASK digital receiver 202 (e.g. corresponding to the chip card module 104).

The reader 201 includes a reader antenna 203 via which it sends an (ASK-) modulated radio signal to the receiver 202. The receiver includes a resonance circuit 204 (including an antenna 205 and a capacity 206 in parallel to the antenna 205) which receives the modulated radio signal as a modulated input signal. The modulated input signal is rectified by means of a rectifier 207 and its analog envelope is extracted by means of a peak detector 208. The digital envelope is digitalized by means of a analog-to-digital converter 209 and a data recovery module 210 extracts the transmitted data based on a data recovery algorithm.

It should be noted that since the reader steadily transmits the carrier signal, the receiver can recover the clock timing in a straightforward manner.

Figure 3:
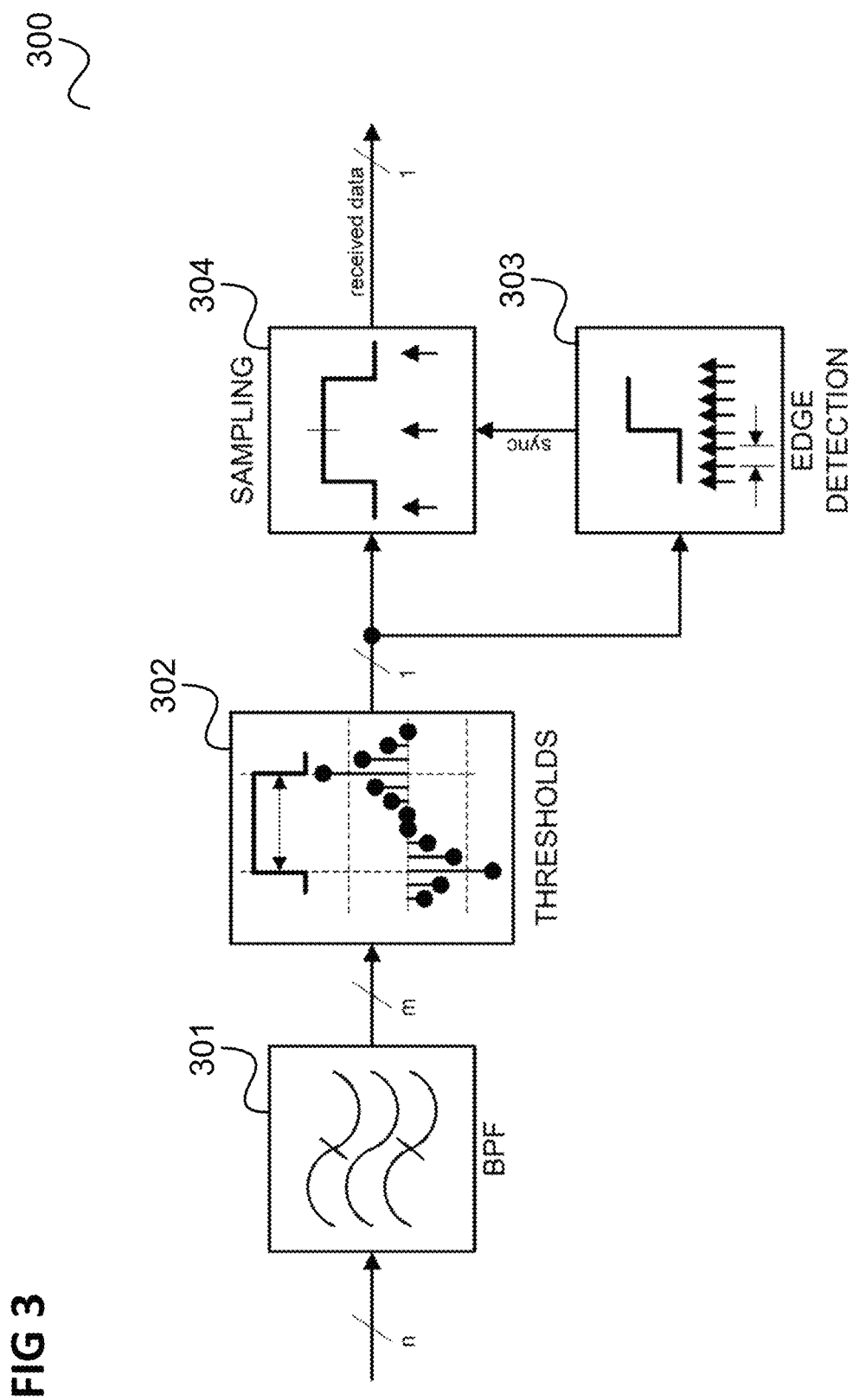
FIG. 3 gives an example of the structure of a data recovery module.

FIG. 3 gives an example of the structure of a data recovery module 300.

The data recovery module 300 for example corresponds to the data recovery module 210.

The data recovery module 300 processes the digital envelope of the modulated input signal by means of a digital bandpass filter 301 in order to detect the edges in the modulated input signal by a first edge detector 302. The first edge detector 302 uses two thresholds to detect the falling and raising edge, respectively. In general, the thresholds may be different and not constant but they can be adapted to the input signal, e.g. may be increased for faster (i.e. steeper) edges in order to increase the robustness against overshoots or undershoots in the modulated input signal.

After this first edge detection by the first edge detector 302, the data transmitted are available as a binary signal which is still asynchronous. A second edge detection by a second edge detector 303 (using a faster clock, e.g. 4 times the bit rate) is performed to detect the beginning of each frame, i.e. the SOF (start of frame), and each start bit (since the bytes can be transmitted asynchronously). The synchronism extracted in this way is used by a sampler 304 to sample the binary signal at the bit rate thus generating a serial stream of received bits.

However, in the approach described with reference to FIG. 3, Inter-symbol interference (ISI) at high baud rates (especially in low field, tuned, where the quality factor of the input resonance circuit 204 increases), causes a data-dependent variation of the edge slopes. This typically results in a variation of the band pass filter 301 output and, in turn, of the binary signal output by the first edge detector 302, i.e. after the threshold comparison. Further, the adaptive thresholds (used to handle overshoots and undershoots) cause additional jitter. Additionally, the edge detection on the binary signal by the second edge detector 303 introduces a further jitter equal to the clock used for the detection (e.g. 4 times the bit rate). If the total jitter exceeds half the bit length, the sampler 304 is not able to extract the data bit correctly.

In view of the above, instead of detecting the edges in the input envelope and then sampling the obtained signal in order to extract the data as in the approach of FIG. 3, the digitalized envelope is, according to various embodiments, directly sampled.

Figure 4:
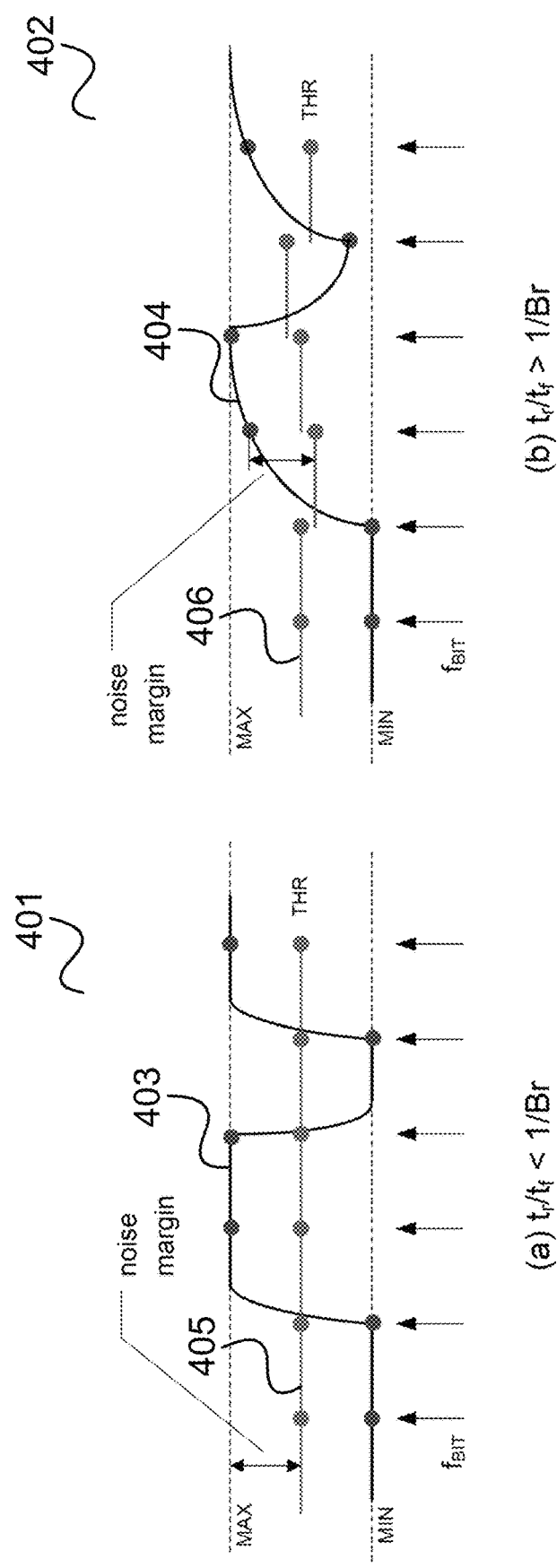
FIG. 4 illustrates the direct sampling of a digitalized envelope.

FIG. 4 illustrates the direct sampling of the digitalized envelope.

A first diagram 401 shows a first example of the input signal 403 with steeper edges and a second diagram 402 shows a second example of the input signal 404 with flatter edges. Time increases from left to right in both diagrams 401, 402.

Specifically, the edge rising time $t_r$ and the edge falling time $t_f$ are smaller than the reciprocal of the bit rate $B_r$ for the first example 403, i.e. $t_r, t_f < 1/B_r$, while they are higher than the reciprocal of the bit rate $B_r$ for the second example 404, i.e. $t_r, t_f > 1/B_r$.

It is desirable to find an optimal detection threshold, i.e. how to decide if a sample represents a logic 1 or a logic 0.

If $t_r/t_f < B_r$ as in the first diagram 401, a threshold 405 set to (MAX+MIN)/2 is the optimal choice, where MAX and MIN are the maximum/minimum data values in the envelope. For the case $t_r/t_f > B_r$ of the second diagram 402, the optimal threshold 406 is not constant and depends on the previously received bits.

Further, symbol synchronization should typically be taken into account, i.e. to sample the envelope in order to achieve a low error probability.

Since no synchronization pattern is available at the beginning of a frame (except if the ISO14443 advanced frame options are used) the synchronization is, according to one embodiment, performed by exploiting a single edge, every time a new synchronization is needed (e.g. at a SOF-low, a SOF-high, or a START-BIT). The symbol synchronization is described in the following.

Figure 5:
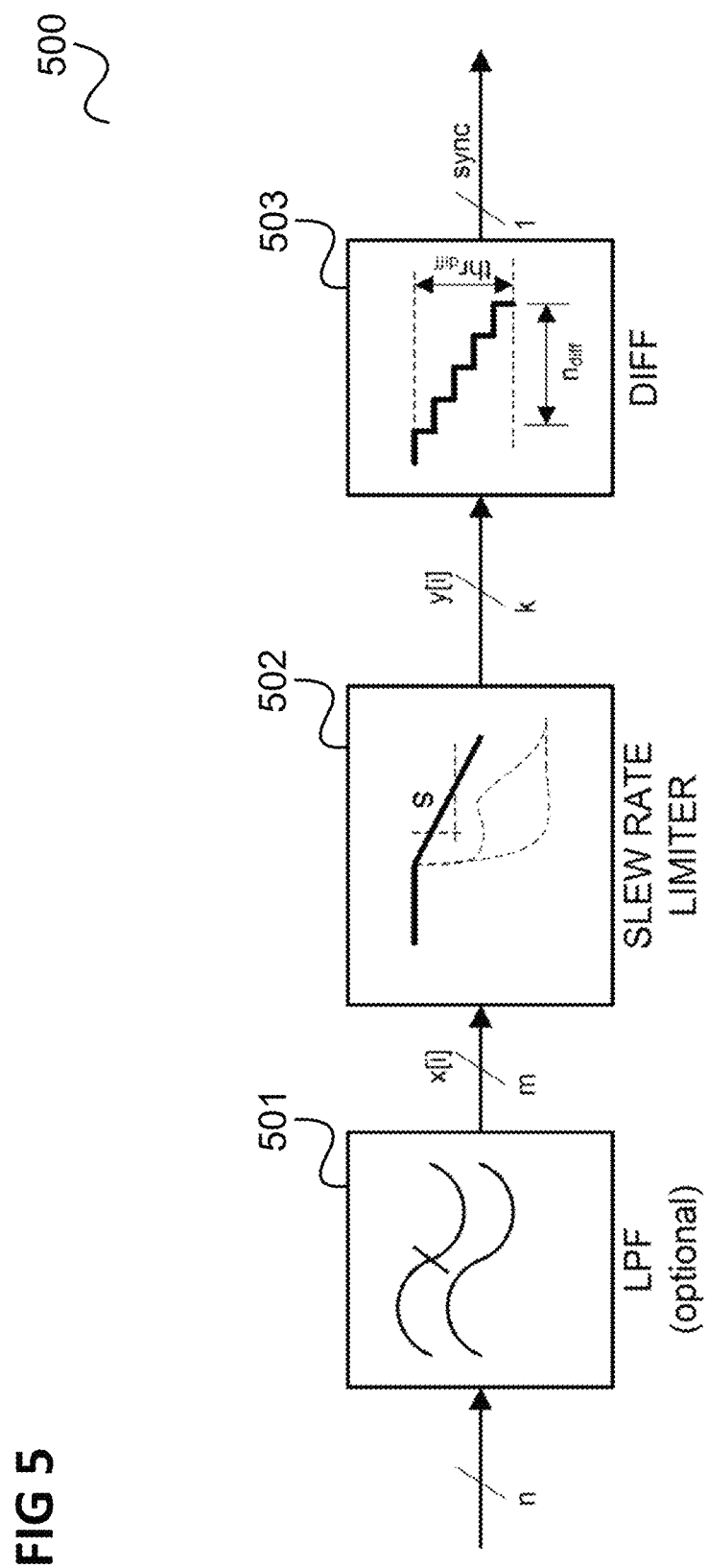
FIG. 5 shows a symbol synchronizer according to an embodiment.

FIG. 5 shows a symbol synchronizer 500 according to an embodiment, e.g. arranged in the data recovery module 210 at its input, i.e. receiving the digital envelope of the modulated input signal.

The digitalized envelope is first processed by an optional low-pass filter 501 (e.g. an average over 4 samples) to decrease the quantization noise and afterwards it goes through a slew rate limiter filter 502 operating according to $$y[i]=y[i-1]+\text{sign}\{x[i]-y[i-1]\}\times\min\{s,|x[i]-y[i-1]|\} \quad (1)$$

where x[i] is the ith input sample of the slew rate limiter, y[i] is the ith output sample of the slew rate limiter and s is the maximum slope to which the signal is limited by the slew rate limiter 502.

Assuming a use of a clock for the synchronization circuit with a clock frequency of $f_{SAMPLE}=8\times B_r$, if the slope s is set to $(2^n \times 2m/(1+m))/8$, where n is the number of input samples and m is the minimum modulation index to be supported, after the slew rate limiter, the output y[i] is independent from modulation index and falling edge timing of the input signal x[i].

A differentiator 503 looking at the difference between two y[i] samples at distance $n_{\mathit{diff}}$ generates a synchronization signal. For instance, if the synchronization point is to be set at the 5th clock cycle after the falling edge, the differentiator 503 compares the slew rate limiter output (i.e. the amount of change in the output of the slew rate limiter after the 5th clock cycle) with a threshold of 5 s.

Figure 6:
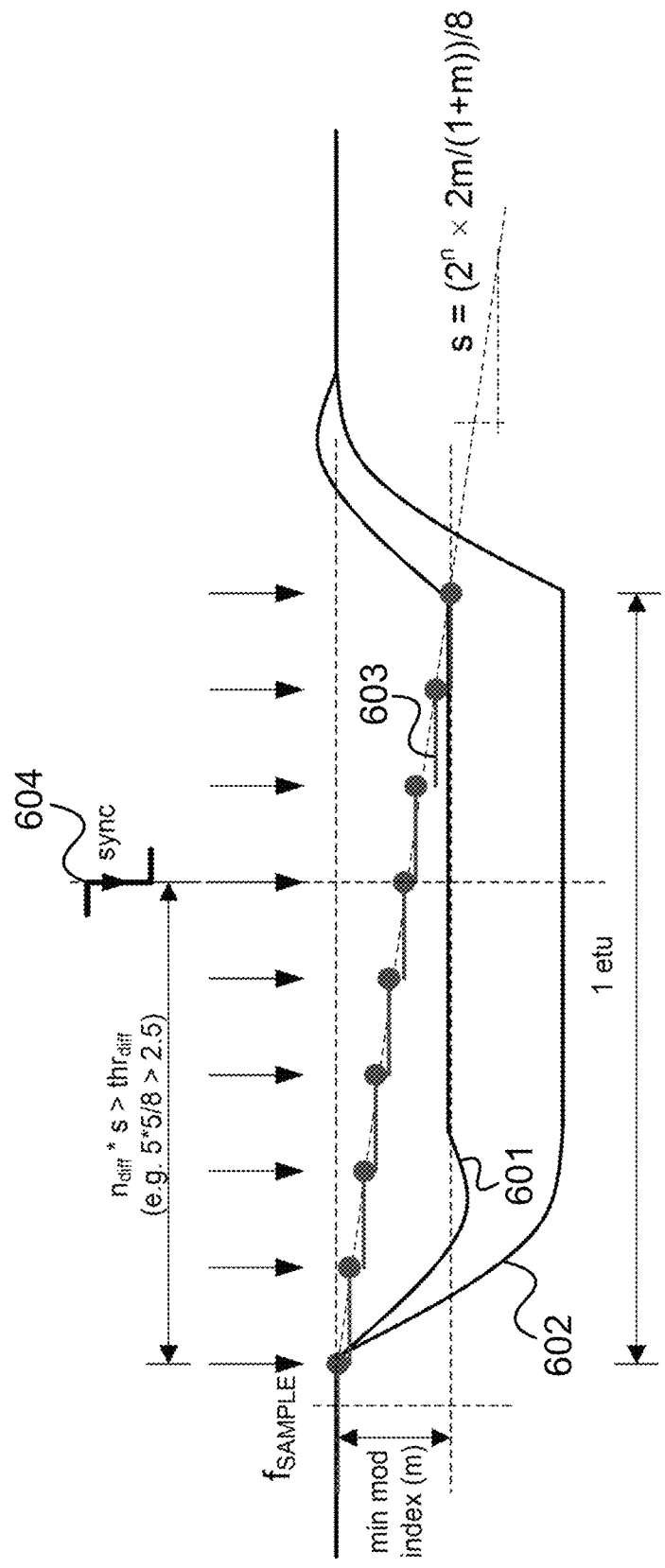
FIG. 6 shows an example of the operation of the symbol synchronizer of FIG. 5.

FIG. 6 shows an example of the operation of the symbol synchronizer for a low start bit of an input signal with minimum modulation index 601 and an input signal with a higher modulation index 602.

The slew rate limiter 502 generates an output signal 603 which is the same for both input signals 601, 602, i.e. which is independent from the modulation index. The differentiator sets a synchronization pulse at the fifth sampling time (of $f_{SAMPLE}$) after the beginning of the falling edge based on that at the fifth sampling time y[i] has fallen by a threshold of $thr_{diff} \leq n_{diff} * s = 5$ s.

Once synchronization with the input signal has been achieved on the receiver side, the receiver can sample the bits of the digitalized envelope of the input signal at the bit rate frequency.

Figure 7:
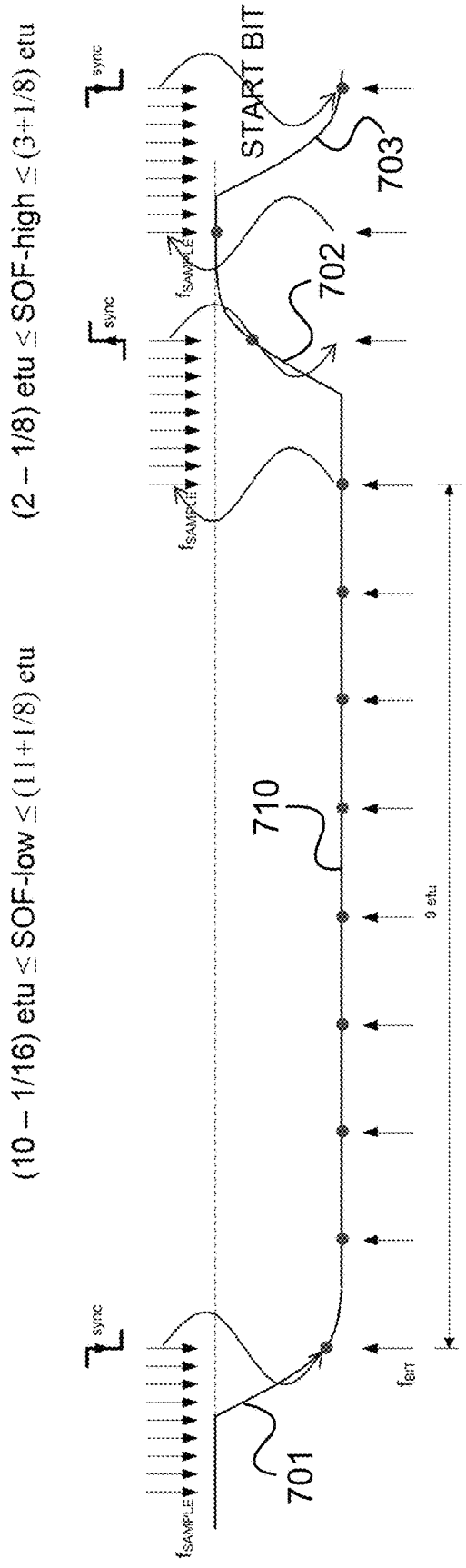
FIG. 7 shows a diagram illustrating an example of symbol synchronization.

Due to the asynchronous timings in the protocol according to ISO 14443, re-synchronizations are performed according to one embodiment as illustrated in FIG. 7.

FIG. 7 shows a diagram 700 illustrating an example of symbol synchronization for an input signal 710.

The receiver activates the synchronizer 500 at the beginning of the reception, in order to detect the start of a frame, indicated by the falling edge of the SOF-low as described with reference to FIG. 6. Afterwards, the receiver can synchronously sample 9 etus (elementary time units), which are low according to the protocol.

At the ninth sample, the receiver again activates the synchronizer 500 changing the sign of the slope and the differential threshold) to detect the SOF-high begin, i.e. the rising edge of the following SOF-high 702. After this second synchronization, the receiver can sample two etus synchronously which are high according to the protocol.

Finally, the receiver activates the synchronizer 500 to detect each START-BIT begin, i.e. the falling edge of a START-BIT. Afterwards, the receiver can sample 10 etus synchronously (including the START-BIT, the DATA BYTE, i.e. one byte of the transmitted data, and the STOP-BIT).

Figure 8:
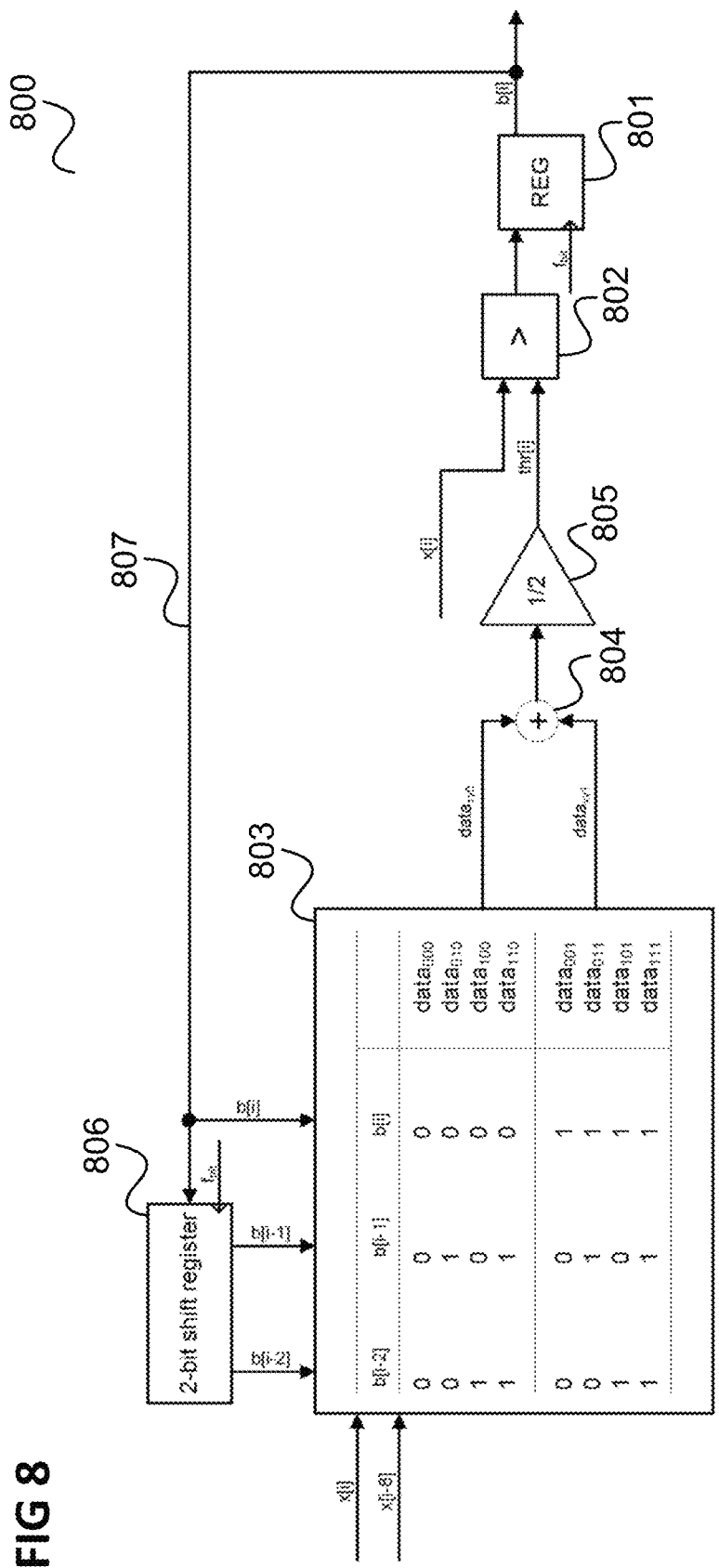
FIG. 8 shows the architecture of a data recovery module according to an embodiment.

Once the receiver has extracted one sample per etu from the digitalized envelope, it can recover the transmitted bits (i.e. control data (such as the bits of SOF-LOW etc.) as well as the transmitted data of the DATA BYTE) using a processing as illustrated in FIG. 8.

FIG. 8 shows the architecture of a data recovery module 800 according to an embodiment.

The data recovery module 800 includes a comparator 802 which generates the current data bit b[i] (i.e. the ith recovered data bit) by comparing the current sample x[i] (of the digitalized envelope after LPF, if any, of an etu of a DATA BYTE) with a current threshold thr[i].

The data recovery module 800 derives the threshold from a look-up table 803 containing sample values $data_{xy0}$ and $data_{xy1}$ which occurred when a zero and a one have been received, respectively, after having first received a certain combination xy of the preceding two bits. For the current bit b[i], the preceding two bits are {b[i−2], b[i−1]}. If b[i−2]=x and b[i−1]=y, an adder 804 and a divider 805 set the threshold to detect the current bit to $(data_{xy0} + data_{xy1})/2$.

For each data bit b[i], the corresponding table entry (depending on b[i−2], b[i−1]) is updated with the sample x[i]. For the indexing of the table 803, the past (or preceding) bits b[i−2], b[i−1] are stored by a 2-bit shift register 806 and the current bit b[i] is fed back via a feedback path 807. The current recovered bit is held by a register 801 which is updated with the bit rate frequency $f_{bit}$.

The size of the table 803 (i.e. the number of previous bits considered) is chosen considering the ISI in the input signal.

The 8-entry table as illustrated in FIG. 8 is sufficient to support the current ISO14443 requirements (ASK up to 6.8 Mbit/s).

According to various embodiments, in order to start the reception, the look-up table 803 is initialized (trained) by exploiting the information available in the SOF (unless a training sequence is available according to the advanced frame option: in this case the table initialization is straightforward).

After initialization, the table 803 can be updated dynamically at each received bit thus allowing the receiver to follow drifts in the envelope.

Figure 9:
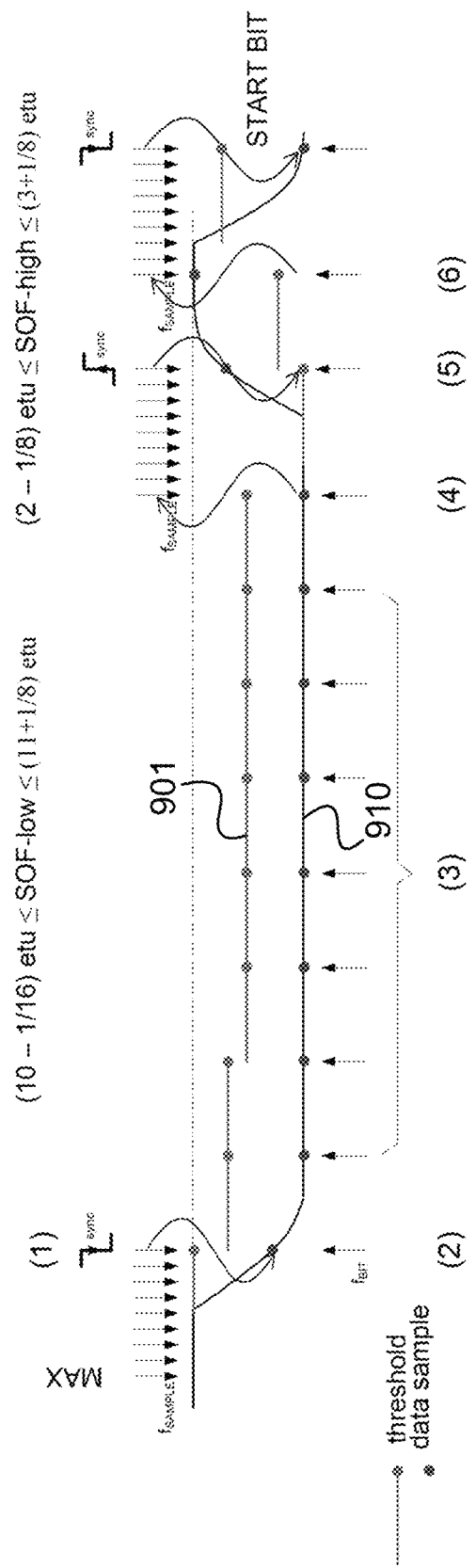
FIG. 9 illustrates a training procedure.

FIG. 9 illustrates the training procedure for an input signal 910 equal to the input signal 710.

(1) On the first edge, the complete table 803 is loaded with a MAX value (e.g. an 8 step older sample of the digitalized envelope x[i−8] derived from a FIFO where the samples are stored).

(2) On the first received bit, the table entries corresponding to the bit sequences xy0 are loaded with the sampled data (110).

(3) Table entries for 100 and 000 are updated during the reception of SOF-low.

(4) On the last zero of SOF-low, the table entries for 001 and 011 are loaded with the current sample (000) to ensure the correct reception of the SOF-high.

(5) On the first bit after the rising edge of SOF-high, the table values for 001 and 101 are updated with the current sample (001).

(6) On the second bit after the rising edge of SOF-high, the table entry for 011 is updated.

This initialization gives rise to threshold values thr[i] 901.

Figure 10:
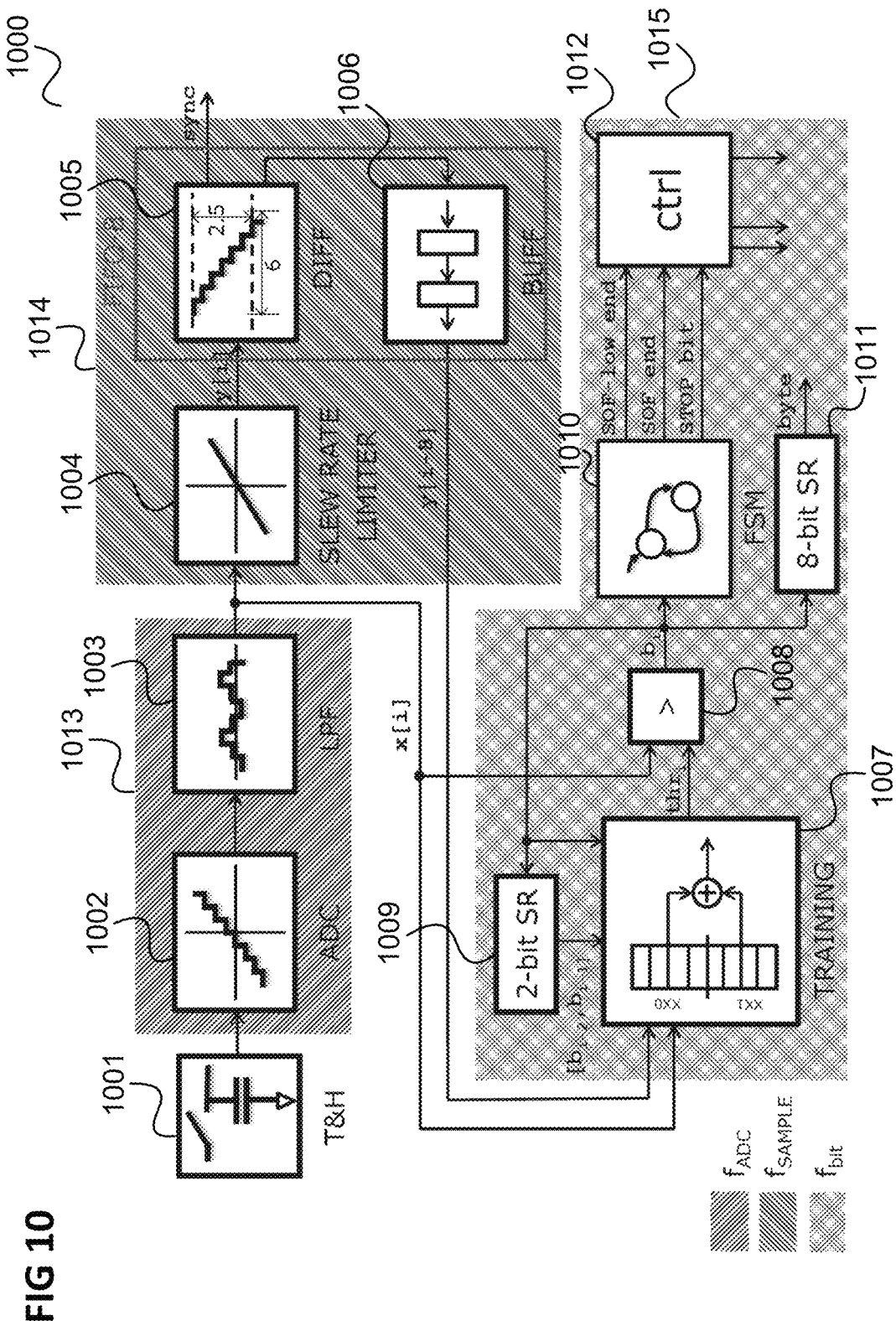
FIG. 10 shows an ASK receiver based on the synchronisation described with reference to FIG. 5 and the data recovery described with reference to FIG. 6.

FIG. 10 shows an ASK receiver 1000 based on the synchronisation described with reference to FIG. 5 and the data recovery described with reference to FIG. 6.

The receiver 1000 includes a track&hold circuit 1001, e.g. corresponding to the peak detector 208, an ADC 1002, e.g. corresponding to the ADC 209, a low-pass filter 1003, e.g. corresponding to the low pass filter 501, a slew rate limiter 1004, e.g. corresponding to slew rate limiter 502, a differentiator 1005, e.g. corresponding to differentiator 503, a buffer 1006, a threshold determination module 1007, e.g. corresponding to table 803, adder 804 and divider 805, a comparator 1008, e.g. corresponding to comparator 802, a 2-bit shift register 1009, e.g. corresponding to shift register 806, a finite state machine 1010, an 8-bit shift register 1011 and a controller 1012.

The ADC 1002 and the low-pass filter 1003 are part of a first clock domain 1013 with a clock frequency of $f_{ADC}$, the slew rate limiter 1004, the differentiator 1005 and the buffer 1006 are part of a second clock domain 1014 with clock frequency $f_{SAMPLE}$ and the threshold determination module 1007, the comparator 1008, the 2-bit shift register 1009, the finite state machine 1010, the 8-bit shift register 1011 and the controller 1012 are part of a third clock domain 1015 with clock frequency fbit, wherein $f_{bit} = B_r$, $f_{SAMPLE} = 8 \times f_{bit}$ and $f_{ADC}$ is the ADC conversion frequency and fADC≥f-SAMPLE. It should be noted that in general, a different number of samples per etu could be used.

The finite state machine 1010 has states corresponding to the positions within the received signal (e.g. within SOF-low, within DATA BYTE etc.) and outputs corresponding signals to the controller 1012 which controls the other components of the receiver accordingly, e.g. switches on the synchronizer, routes the transmitted data to other components (i.e. separates the recovered control data from the recovered useful data) etc. For example, the controller 1012 controls the 8-bit shift register 1011 to receive and store a byte of recovered (useful) data to be forwarded to another component for further processing.

The slew rate limiter 1004 may be implemented as filter directly based on equation (1).

Figure 11:
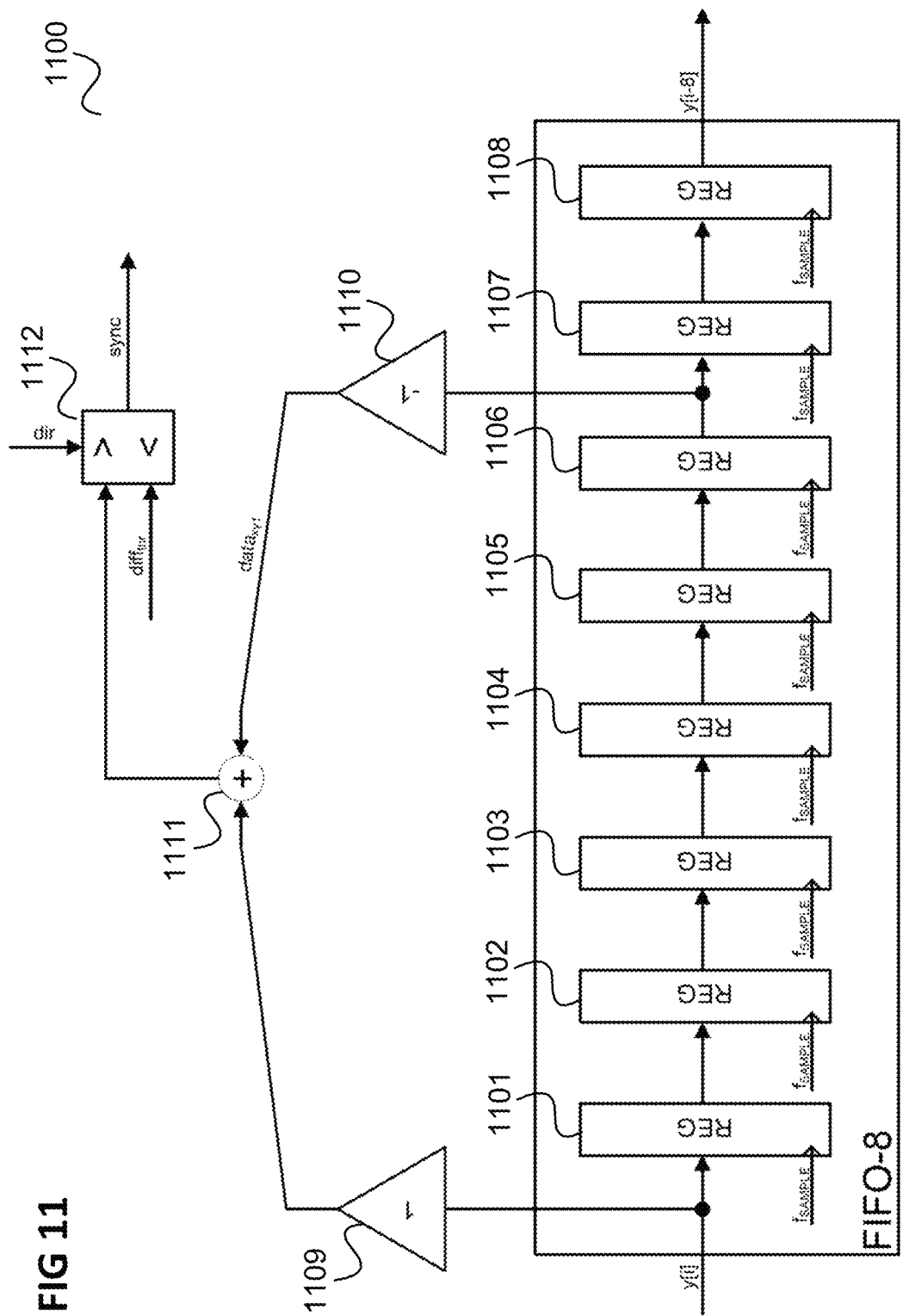
FIG. 11 shows an example for an implementation of a differentiator.

FIG. 11 shows a differentiator 1100 as an example of an implementation of the differentiator 1005.

In this example, $n_{\textit{diff}}=6$.

The differentiator includes a chain of registers 1101 to 1108 which each store an output sample of the slew rate limiter 1004 and which are clocked with $f_{SAMPLE}$, i.e. the samples propagate with $f_{SAMPLE}$ from left to right to the chain of registers 1101 to 1108. The chain of registers 1101 to 1108 thus can be seen to form an 8-value FIFO (first in first out) register.

The current output sample of the slew rate limiter 1004 is supplied to last two registers 1107, 1108 of the 8-value FIFO. The sample stored in the sixth register 1106 is supplied to an inverter 1110. The output of the buffer 1109 and the output of the inverter 1110 are added by an adder 1111 and a comparator 1112 compares the result with the threshold $thr_{\textit{diff}}$ and, depending on whether a rising or a falling edge is to be detected, as indicated by a signal dir, outputs a sync pulse if the result is above the threshold $thr_{\textit{diff}}$ or below the threshold $thr_{\textit{diff}}$ respectively.

At the beginning of the reception (SOF falling edge), y[i−8]=x[i−8]=MAX is the value used to load the training table according to (1) as described above, e.g. provided by the differentiator 1100 via the buffer 1006.

Figure 12:
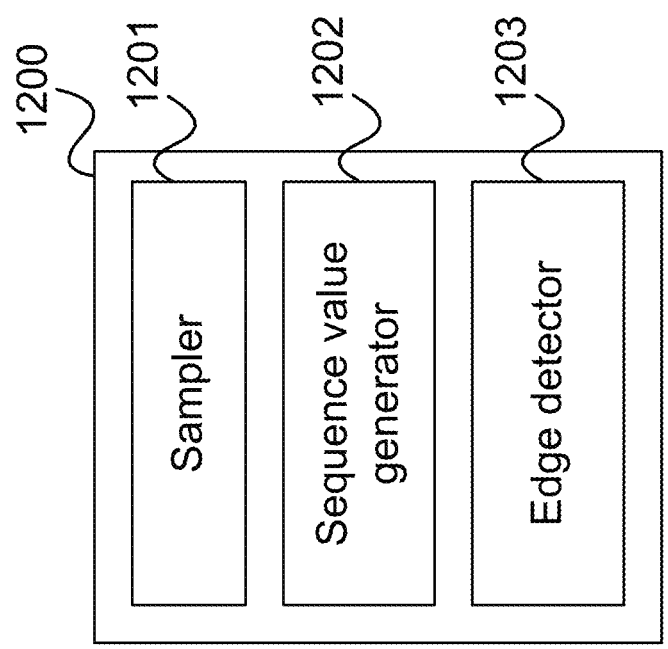
FIG. 12 shows a communication device according to an embodiment.

In summary, according to various embodiments, a communication device is provided as illustrated in FIG. 12.

FIG. 12 shows a communication device 1200.

The communication device 1200 includes a sampler 1201 configured to sample an input signal, wherein the sampler 1201 is configured to generate a sampled value for each sampling time of a sequence of sampling times.

Further, the communication device 1200 includes a sequence value generator 1202 configured to generate an output value for each sampling time of the sequence of sampling times based on the sampled values, wherein the sequence value generator 1202 is configured to set the output value for a sampling time based on the sampled value for the sampling time and based on a limitation of the difference between the output value for the sampling time and the output value for the preceding sampling time in the sequence of sampling times.

The communication device 1200 further includes an edge detector 1203 configured to detect an edge in the input signal based on the output values.

According to one embodiment, in other words, the slew rate of an input signal at an edge (rising edge or falling edge) is limited by processing the sample values before edge detection. For example, for each sample interval, the amount that the (processed) sample values may change (i.e. the change over one sample interval, i.e. from one sample value to the next) is limited, e.g. to a maximum value if it exceeds a threshold (e.g. the maximum value to which it is capped). The resulting processed sampled values (denoted as output values of the sequence value generator, e.g. slew rate delimiter) are then used for edge detection. The limitation of the difference may for example be set such that the output values (or the slew of the output values) are independent from the modulation index, e.g. in context of ASK (amplitude shift keying). For example, it may be set such that the slew is limited to a slew which occurs when using a minimal modulation index (of, e.g., a plurality of available modulation indexes).

Figure 13:
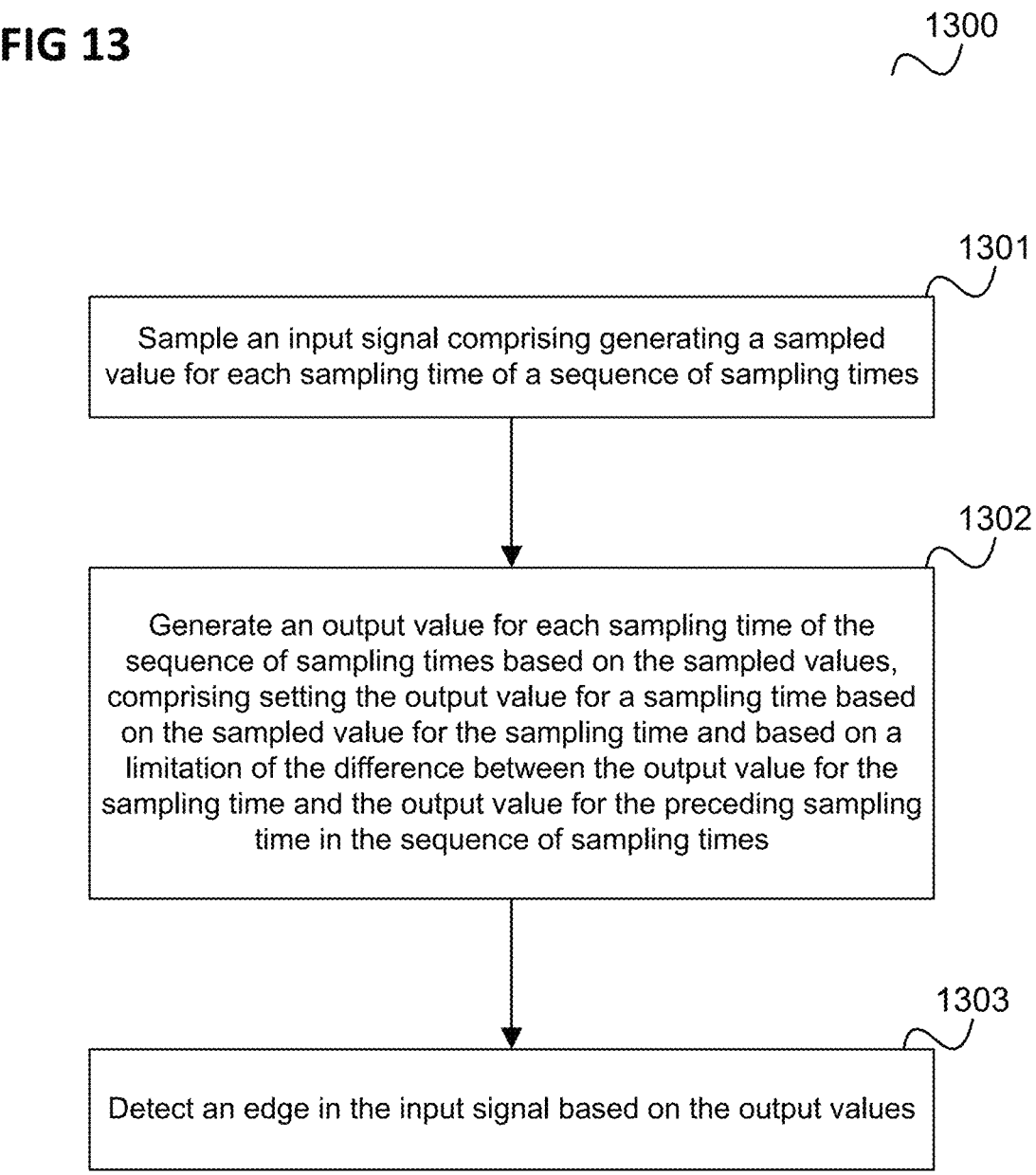
FIG. 13 shows a flow diagram illustrating a method for detecting an edge in a received signal.

The communication device 1200 for example carries out a method as illustrated in FIG. 13.

FIG. 13 shows a flow diagram 1300 illustrating a method for detecting an edge in a received signal.

In 1301, an input signal is sampled including generating a sampled value for each sampling time of a sequence of sampling times.

In 1302, an output value is generated for each sampling time of the sequence of sampling times based on the sampled values, including setting the output value for a sampling time based on the sampled value for the sampling time and based on a limitation of the difference between the output value for the sampling time and the output value for the preceding sampling time in the sequence of sampling times.

In 1303, an edge in the input signal is detected based on the output values.

Figure 14:
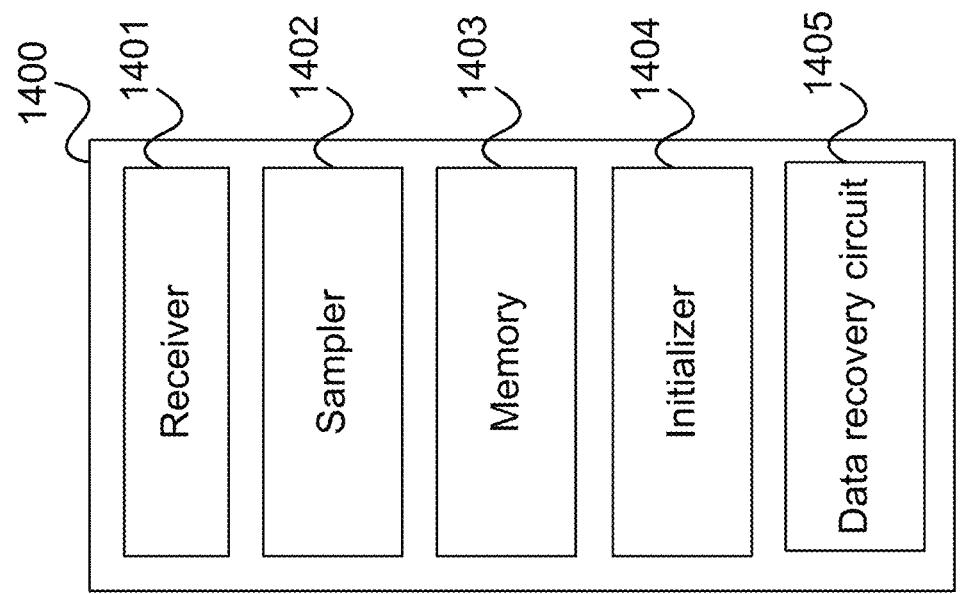
FIG. 14 shows a communication device according to a further embodiment.

Further, according to various embodiments, a communication device is provided as illustrated in FIG. 14.

FIG. 14 shows a communication device 1400.

The communication device 1400 includes a receiver 1401 configured to receive a signal representing a predefined sequence of digital values from a transmitter and a sampler 1402 configured to sample the signal for each digital value of the predefined sequence of digital values.

Further, the communication device 1400 includes a memory 1403 configured to store a table giving, for each of a plurality of combinations of one or more preceding first digital values and a following second digital value, a threshold for a signal level to detect the second digital value, wherein the predefined sequence of digital values represented by the received signal includes a subset of the plurality of combinations.

The communication device 1400 further includes an initializer 1404 configured to for a combination in the subset of the plurality of combinations, initialize the table based on a sample of the signal for the second value and for a combination outside of the subset, select a combination from the subset and initialize the table based on a sample of the signal for the second value of the selected combination.

Further, the communication device 1400 includes a data recovery circuit 1405 configured to receive data from the transmitter based on the initialized table.

According to one embodiment, in other words, a predefined sequence which is not a complete training sequence, i.e. which lacks possible combinations of successive digital values (e.g. bit values), e.g. does not contain all possible combinations of a certain length is used to initialize a table indicating detection thresholds for combinations (e.g. all possible value combinations) of the length. In other words, a sample value of a combination is used to initialize the table for a different combination.

The predefined sequence is for example a synchronization sequence. For example, the communication device and the transmitter communicate (send and receive) signals according to a radio frame structure, e.g. according to a radio communication protocol (e.g. a contactless chip card communication protocol such as ISO 14443) and the synchronization sequence is a sequence indicating the start of a frame according to the radio frame structure.

The communication device 1400 for example carries out a method as illustrated in FIG. 15.

FIG. 15 shows a flow diagram 1500 illustrating a method for receiving data.

In 1501, a signal is received from a transmitter representing a predefined sequence of digital values from a transmitter.

In 1502, the signal is sampled for each digital value of the predefined sequence of digital values.

In 1503, a table is initialized giving, for each of a plurality of combinations of one or more preceding first digital values and a following second digital value, a threshold for a signal level to detect the second digital value, wherein the predefined sequence of digital values represented by the received signal includes a subset of the plurality of combinations. The initializing includes for a combination in the subset of the plurality of combinations, initializing the table based on a sample of the signal for the second value, and for a combination outside of the subset, selecting a combination from the subset and initializing the table based on a sample of the signal for the second value of the selected combination.

In 1504, data are received data from the transmitter based on the initialized table.

In the following, various embodiments are given.

Embodiment 1 is a communication device as illustrated in FIG. 12.

Embodiment 2 is the communication device of embodiment 1, wherein the sequence value generator is configured to set the output value for each sampling time of the sequence of sampling times except the first sampling time of the sequence of sampling times based on the sampled value for the sampling time and based on a limitation of the difference between the value for the sampling time and the value for the preceding sampling time in the sequence of sampling times.

Embodiment 3 is the communication device of embodiments 1 or 2, wherein the sequence value generator is configured to set the output value for the first sampling time of the sequence of sampling times based on the sampling value of the first sampling time of the sequence of sampling times.

Embodiment 4 is the communication device of embodiments 1 or 2, wherein the sequence value generator is configured to set the output value for the first sampling time of the sequence of sampling times equal to the sampling value of the first sampling time of the sequence of sampling times.

Embodiment 5 is the communication device of any one of embodiments 1 to 4, wherein the edge detector is configured to detect an edge based on whether the difference between the output value for the first sampling time on the output value for a later sampling time is below a predetermined threshold.

Embodiment 6 is the communication device of any one of embodiments 1 to 5, wherein the sequence value generator is configured to set the output value for a sampling time based on the sampled value for the sampling time and based on a limitation of the difference between the output value for the sampling time and the output value for the preceding sampling time in the sequence of sampling times to a fixed value.

Embodiment 7 is the communication device of embodiment 6, wherein the edge detector is configured to detect an edge at a candidate sampling time of the sequence of sampling times based on whether the output value has fallen from each sampling time to the next sampling time between the first sampling time and the candidate sampling time.

Embodiment 8 is the communication device of any one of embodiments 1 to 7, wherein the sequence value generator is configured to check whether the difference between a sampled value for a sampling time and the output value for the preceding sampling time in the sequence of sampling times is above a predetermined threshold and, if the difference is above the predetermined threshold, generate an output value for the sampling time to limit the difference to or below the predetermined threshold.

Embodiment 9 is the communication device of embodiment 8, wherein the sequence value generator is configured to, if the difference is above the predetermined threshold, set the output value to the sampled value of the preceding sampling time minus a predetermined value if the difference is negative or plus a predetermined value if the difference is positive.

Embodiment 10 is the communication device of embodiment 9, wherein the predetermined value is the predetermined threshold.

Embodiment 11 is the communication device of any one of embodiments 1 to 10, wherein the edge detector is configured to detect a rising edge based on whether the output values increase over the sequence of sampling times.

Embodiment 12 is the communication device of any one of embodiments 1 to 11, wherein the edge detector is configured to detect a falling edge based on whether the output values decrease over the sequence of sampling times.

Embodiment 13 is the communication device of any one of embodiments 1 to 12, wherein the input signal is modulated based on amplitude shift keying.

Embodiment 14 is a method for detecting an edge in a received signal as illustrated in FIG. 13.

Embodiment 15 is a communication device as illustrated in FIG. 14.

Embodiment 16 is the communication device of embodiment 15, wherein the initializer is configured to select the combination from the subset according to a predetermined selection criterion.

Embodiment 17 is the communication device of embodiment 15 or 16, wherein the initializer is configured to select the combination from the subset based on that at least one of the first digital values of the selected combination is equal to the corresponding first digital value of the combination outside of the subset.

Embodiment 18 is the communication device of any one of embodiments 15 to 17, wherein the initializer is configured to select the combination from the subset based on that the second digital value of the selected combination is equal to the second digital value of the combination outside of the subset.

Embodiment 19 is the communication device of any one of embodiments 15 to 18, wherein the signal is based on a transmission of the predefined sequence of digital values by the transmitter.

Embodiment 20 is the communication device of any one of embodiments 15 to 19, wherein the signal is modulated based on the predefined sequence of digital values.

Embodiment 21 is the communication device of any one of embodiments 15 to 20, wherein the signal is modulated based on amplitude shift keying.

Embodiment 22 is the communication device of any one of embodiments 15 to 21, wherein each combination includes two preceding first digital values and one following second digital value.

Embodiment 23 is the communication device of any one of embodiments 15 to 22, wherein the plurality of combinations includes all possible combinations of values for the preceding first values and the following second value.

Embodiment 24 is the communication device of any one of embodiments 15 to 23, wherein the first digital values and the second digital values are bit values.

Embodiment 25 is the communication device of any one of embodiments 15 to 24, further including an updater configured to at least one of for a combination in the subset of the plurality of combinations, update the initialized table based on a sample of the signal for the second value; and for a combination outside of the subset, select a combination from the subset and update the initialized table based on a sample of the signal for the second value of the selected combination.

Embodiment 26 is a method for receiving data as illustrated in FIG. 15.

According to a further embodiment, a communication device is provided including a slew rate limiter configured to limit the slew in a sequence of sample values of an input signal and an edge detector configured to detect an edge in the input signal based on the slew-rate limited sequence of sample values.

According to a further embodiment, a communication device is provided having a table which stores data detection thresholds for a set of different combinations of preceding sample values and an initializer configured to initialize the table based on the received signal values for a (proper) subset of the set of combinations.

It should be noted that embodiments described in context of one of the communication devices are analogously valid for the other communication devices and the methods and vice versa and embodiments may be combined with each other. In particular, a communication device according to both FIGS. 12 and 14 may be provided.

The communication devices may for example be implemented by chip card modules, including devices such as RFID (radio-frequency identification) transponders.

One or more or a combination of the embodiments as described above may for example be used to implement an ASK synchronous receiver which supports ISO14443 type-B frames without synchronization and training patterns.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a sampler configured to sample an input signal, wherein the sampler is configured to generate a sampled value for each sampling time of a sequence of sampling times; and
   a sequence value generator configured to generate an output value for each sampling time of the sequence of sampling times by:
      comparing, to a predetermined slope threshold, the difference between the sampled value for a sampling time and the output value for a preceding sampling time in the sequence of sampling times, and
      if the difference is greater than the predetermined slope threshold, setting the output value for the sampling time as the sampled value for the sampling time plus or minus the predetermined slope threshold;
   the communication device further comprising an edge detector configured to detect an edge in the input signal based on the output values.

2. The communication device of claim 1, wherein the sequence value generator is configured to set the output value for each sampling time of the sequence of sampling times except the first sampling time of the sequence of sampling times based on the sampled value for the sampling time and based on limiting the difference between the output value for each sampling time and the output value for a preceding sampling time in the sequence of sampling times.

3. The communication device of claim 1, wherein the sequence value generator is configured to set the output value for the first sampling time of the sequence of sampling times based on the sampled value of the first sampling time of the sequence of sampling times.

4. The communication device of claim 1, wherein the sequence value generator is configured to set the output value for the first sampling time of the sequence of sampling times equal to the sampled value of the first sampling time of the sequence of sampling times.

5. The communication device of claim 1, wherein the edge detector is configured to detect an edge based on whether the difference between the output value for a given sampling time and the output value for a later sampling time is less than a predetermined edge threshold.

6. The communication device of claim 5, wherein the later sampling time is multiple samples after the given sampling time in the sequence of sampling times.

7. The communication device of claim 1, wherein the edge detector is configured to detect an edge at a candidate sampling time of the sequence of sampling times based on whether the output value has fallen from each sampling time to the next sampling time between the first sampling time and the candidate sampling time.

8. The communication device of claim 1, wherein the edge detector is configured to detect a rising edge based on whether the output values increase over the sequence of sampling times.

9. The communication device of claim 1, wherein the edge detector is configured to detect a falling edge based on whether the output values decrease over the sequence of sampling times.

10. The communication device of claim 1, wherein the input signal is modulated based on amplitude shift keying.

11. The communication device of claim 1, wherein the preceding sampling time is immediately before the sampling time in the sequence of sampling times.

12. The communication device of claim 1, wherein the sequence value generator is further configured to generate the output value for each sampling time of the sequence of sampling times by:
   if the difference is less than the predetermined slope threshold, setting the output value for the sampling time as the sampled value for the sampling time.

13. The communication device of claim 1, wherein the sequence value generator is configured to:
   if the difference is greater than the predetermined threshold and if the sampled value for the sampling time is greater than the output value for the preceding sampling time, set the output value for the sampling time as the output value for the preceding sampling time plus the predetermined slope threshold;
   if the difference is greater than the predetermined threshold and if the sampled value for the sampling time is less than the output value for the preceding sampling time, set the output value for the sampling time as the output value for the preceding sampling time minus the predetermined slope threshold.

14. A method for detecting an edge in a received signal, the method comprising:
sampling an input signal comprising generating a sampled value for each sampling time of a sequence of sampling times;
generating an output value for each sampling time of the sequence of sampling times based on the sampled values, the generating comprising:
comparing, to a predetermined slope threshold, the difference between the sampled value for a sampling time and the output value for a preceding sampling time in the sequence of sampling times, and
if the difference is greater than the predetermined slope threshold, setting the output value for the sampling time as the sampled value for the sampling time plus or minus the predetermined slope threshold;
the method further comprising detecting an edge in the input signal based on the output values.

15. The method of claim 14, wherein the preceding sampling time is immediately before the sampling time in the sequence of sampling times.

16. The method of claim 14, wherein generating the output value for each sampling time of the sequence of sampling times further comprises:
if the difference is less than the predetermined slope threshold, setting the output value for the sampling time as the sampled value for the sampling time.

17. The method of claim 14, wherein generating the output value for each sampling time of the sequence of sampling times further comprises:
if the difference is greater than the predetermined threshold and if the sampled value for the sampling time is greater than the output value for the preceding sampling time, set the output value for the sampling time as the output value for the preceding sampling time plus the predetermined slope threshold;
if the difference is greater than the predetermined threshold and if the sampled value for the sampling time is less than the output value for the preceding sampling time, set the output value for the sampling time as the output value for the preceding sampling time minus the predetermined slope threshold.

18. The method of claim 14, wherein detecting the edge in the input signal based on the output values comprises:
detecting the edge based on whether the difference between the output value for a given sampling time and the output value for a later sampling time is less than a predetermined edge threshold.

19. The method of claim 18, wherein the later sampling time is multiple samples after the given sampling time in the sequence of sampling times.

* * * * *